(No Model.)

C. W. LIVERMORE, Dec'd.
M. A. B. LIVERMORE, Executrix.
CASH CARRIER APPARATUS.

No. 479,762.

Patented July 26, 1892.

FIG. 1.

WITNESSES.
D. H. Hayword
F. George Barry

INVENTOR.
Charles W. Livermore
By Mary A. B. Livermore Exec.
By Brown Seward Attys.

(No Model.) 8 Sheets—Sheet 3.

C. W. LIVERMORE, Dec'd.
M. A. B. LIVERMORE, Executrix.
CASH CARRIER APPARATUS.

No. 479,762. Patented July 26, 1892.

WITNESSES.
H. George Barty
D. H. Hayward

INVENTOR
Charles W. Livermore
By Mary A. B. Livermore
Exec'x.
By Brown & Seward Attys (No Model.) 8 Sheets—Sheet 4.

C. W. LIVERMORE, Dec'd.
M. A. B. LIVERMORE, Executrix.
CASH CARRIER APPARATUS.

No. 479,762. Patented July 26, 1892.

WITNESSES.
F. George Batty
D. H. Haywood

INVENTOR.
Charles W. Livermore
By Mary A. B. Livermore
Exec'x.
By Brown & Seward Atty

(No Model.) 8 Sheets—Sheet 5.

C. W. LIVERMORE, Dec'd.
M. A. B. LIVERMORE, Executrix.
CASH CARRIER APPARATUS.

No. 479,762. Patented July 26, 1892.

WITNESSES.
F. George Barry
D. H. Hayward

INVENTOR.
Charles W. Livermore
By Mary A. B. Livermore
Execx.
By Brown & Seward Attys.

(No Model.) 8 Sheets—Sheet 6.

C. W. LIVERMORE, Dec'd.
M. A. B. LIVERMORE, Executrix.
CASH CARRIER APPARATUS.

No. 479,762. Patented July 26, 1892.

WITNESSES.
F. George Barry
D. H. Hayward

INVENTOR.
Charles W. Livermore
By Mary A. B. Livermore
Exec'r
By Brown & Seward Atty.

(No Model.) 8 Sheets—Sheet 7.

C. W. LIVERMORE, Dec'd.
M. A. B. LIVERMORE, Executrix.
CASH CARRIER APPARATUS.

No. 479,762. Patented July 26, 1892.

WITNESSES.

INVENTOR.

(No Model.) 8 Sheets—Sheet 8.

C. W. LIVERMORE, Dec'd.
M. A. B. LIVERMORE, Executrix.
CASH CARRIER APPARATUS.

No. 479,762. Patented July 26, 1892.

Fig. 23.

WITNESSES.
J. George Barty
A. H. Hayward

INVENTOR
Charles W. Livermore
By Mary A. B. Livermore
Execrx.
By Brown & Seward Atty.

UNITED STATES PATENT OFFICE.

MARY A. B. LIVERMORE, OF PROVIDENCE, RHODE ISLAND, EXECUTRIX OF CHARLES W. LIVERMORE, DECEASED, ASSIGNOR TO THE KENNEY ELECTRICAL CASH CARRIER COMPANY, OF PORTLAND, MAINE.

CASH-CARRIER APPARATUS.

SPECIFICATION forming part of Letters Patent No. 479,762, dated July 26, 1892.

Application filed June 4, 1890. Serial No. 354,259. (No model.)

*To all whom it may concern:*

Be it known that CHARLES W. LIVERMORE, deceased, late of Providence, in the county of Providence and State of Rhode Island, invented a new and useful Improvement in Cash-Carrier Apparatus, of which the following is a specification.

The invention relates to a cash-carrier apparatus, the fundamental principles of which are disclosed in Letters Patent No. 329,050, granted to Thomas M. Kenney October 27, 1885, and No. 343,539, granted to said Kenney June 8, 1886, the object of the present invention being to provide such details of construction as will render the apparatus eminently practicable.

To this end the invention consists in certain features of construction and combination of parts, as will be hereinafter described and pointed out in the claims.

In the accompanying drawings.

In the apparatus herein represented a carriage for collecting and discharging pouches is caused to move continuously along an endless track. The apparatus is particularly adapted to the employment of electricity as a motive power for causing the carriage to move continuously, two rails insulated from each other and charged with electricity from the opposite poles of the battery being employed, and the carriage being provided with an electric motor actuated through suitable connections with the two oppositely-charged rails to drive the carriage.

Stations located at convenient intervals along the track are provided with means for supporting a pouch in position to be taken by the carriage and with stops to remove a pouch from the carriage. A cashier's station is provided with a support corresponding to the entire number of stations, upon which the pouches may be placed, so as to be taken by the carriage as it passes, and with a stop or stops for removing from the carriage any pouches which it may have collected. The construction is such that no pouch, excepting the one intended for that particular station, will be stopped at that point, while the pouches supported for collection will be in every instance taken up by the passing carriage and deposited at the cashier's station.

In describing the mechanism by which the above-recited results are accomplished it is found convenient to describe the several parts of the apparatus in the following order: the track, the carriage, the pouch, the collecting devices, and the discharge devices.

The track consists of a lower endless rail A and an upper endless rail A'. In the preferred form here shown the lower rail consists of a metallic strip set upon its edge and having its upper edge $a$ rounded for the reception of the groove in the periphery of the carriage-wheel. The rail A may be formed in sections of convenient length joined together, so as to form a continuous bearing-face. The upper rail A' consists of a strip of metal, preferably of rectangular form and of such thickness as to give it the required rigidity, its opposite faces $a'$ forming the bearing-faces of the rail to engage the guide-rollers of the carriage, as will hereinafter appear. In view of the relations which must be sustained between the position of the carriage with its collecting and discharging devices and the supports and stops at the stations, in order to carry out the results in the most satisfactory manner it is important that the rails A A' should be held against any considerable variance relatively to each other throughout their entire length. To so hold them, the brackets B, preferably of G form, as shown, are provided at frequent intervals along the track, the lower end of the bracket having an extended seat $b$ for the reception of the meeting ends of two rail-sections and with a flange $b'$, through which extend fastenings $b^2$ for the purpose of securing the ends of the rail-sections firmly to the bracket. The upper end of the bracket is also provided with an extended rest $b^3$ for receiving the meeting ends of the upper rail-sections on its under side and with fastenings $b^4$ for securing the said rail-sections to the rest in such a manner as to leave their opposite edges $a'$ free to be traversed by the guide-rollers. When the track is to be supported from the ceiling, hangers C are provided, the lower ends of which are fixed to the upper ends of the brackets, while the upper ends of the hangers have a screw-threaded engagement with socket-plates $c$, fixed to the ceiling, by which arrangement the track may be bodily adjusted in a vertical direction. The socket-plates $c$ are conveniently secured to the ceiling by screws $c'$. In the employment of electricity as a motive power the upper and lower rails A A' are insulated from each other in any well-known and approved manner, and electricity may be supplied thereto from the opposite poles of a battery by means of insulated wires $c^2$ $c^3$, extending along the ceiling and down in proximity to one of the hangers C, the wire $c^2$ being electrically connected with the upper rail A' by a binding-post $c^4$, while the wire $c^3$ extends along down the back of the bracket B and is electrically connected with the lower rail A by a binding-post $c^5$. It is obvious that if the track were to be supported from below a standard might be employed in connection with the lower end of the bracket instead of the hanger C in connection with the upper end of the same, and it is further obvious that the means for conducting electricity to the rails might be other than hereinbefore mentioned. By means of the brackets, their supports, and the rail-sections as thus constructed the track may be compactly packed for shipment and set up with great readiness and without liability of any derangement of the rails.

Figure 1:
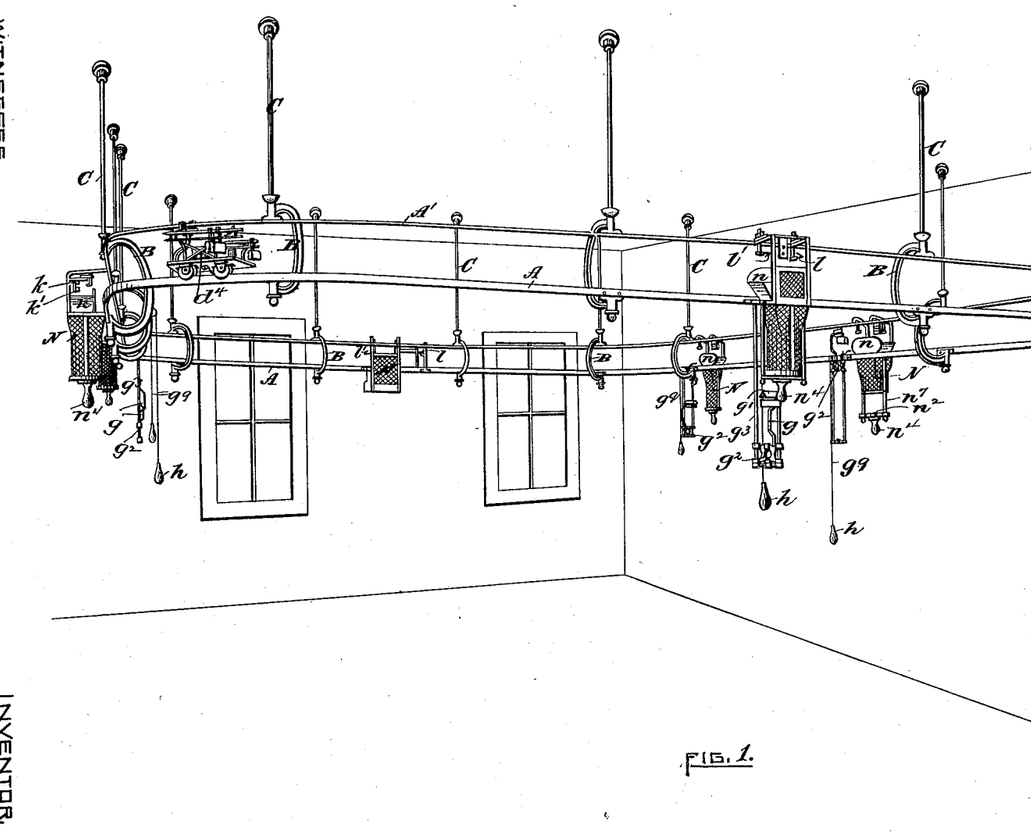
Figure 1 represents a perspective view upon a small scale of the apparatus as a whole, as it appears when suspended by hangers.
Figures 2, 4:
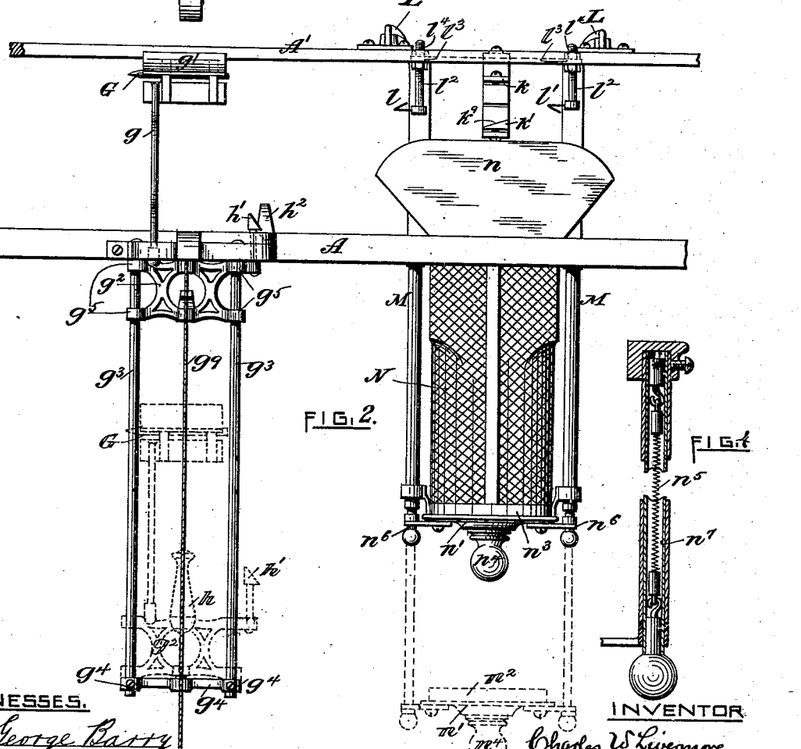
Fig. 2 represents in side elevation and upon a larger scale one of the stations which may be located along the line of track for collecting and discharging pouches.
Fig. 4 is an enlarged detail view in section of one of the supports for the receiving-pocket, showing the spring for automatically elevating the bottom of the pocket.
Figure 3:
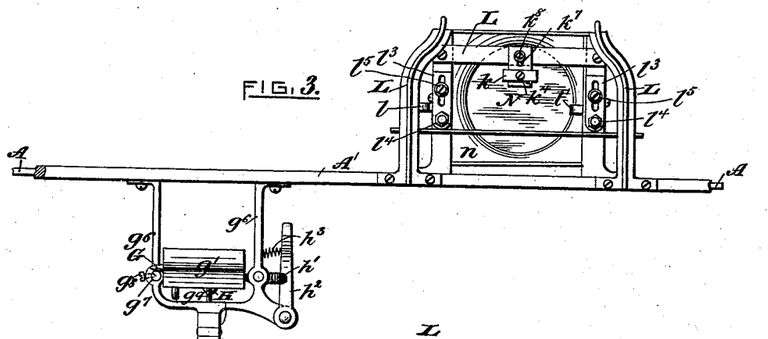
Fig. 3 is a top plan view of the same.
Figures 5, 6, 7:
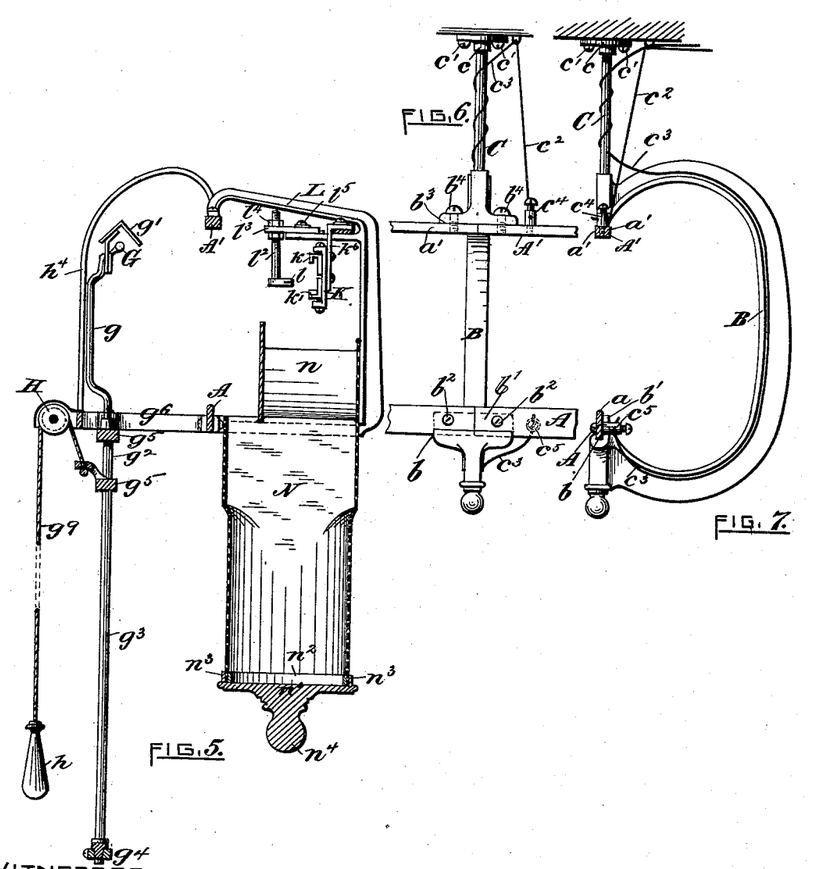
Fig. 5 is a transverse section through the pouch collecting and receiving apparatus and track at one of the stations.
Fig. 6 is a view in side elevation of a portion of the track at the point where it is attached to the supporting-bracket, showing means for supplying an electric current to the rails.
Fig. 7 is an end view of the same, showing one of the securing brackets in elevation.
Figure 21:
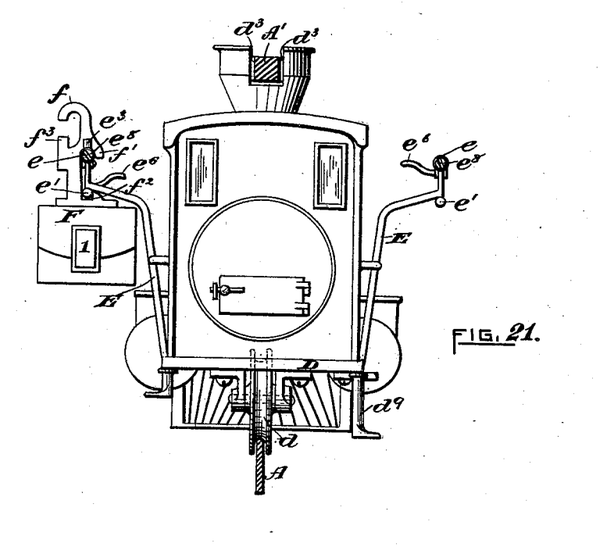
Fig. 21 is a rear view of the same.
Figure 22:
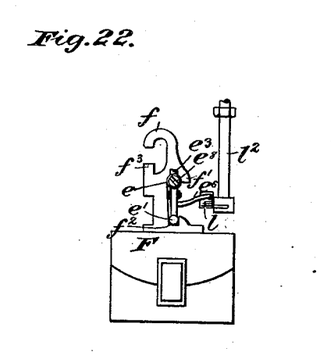
Fig. 22 represents an enlarged detail view of the holding and releasing device in connection with one of the pouch collecting and receiving bars and also means for actuating it.
Figure 23:
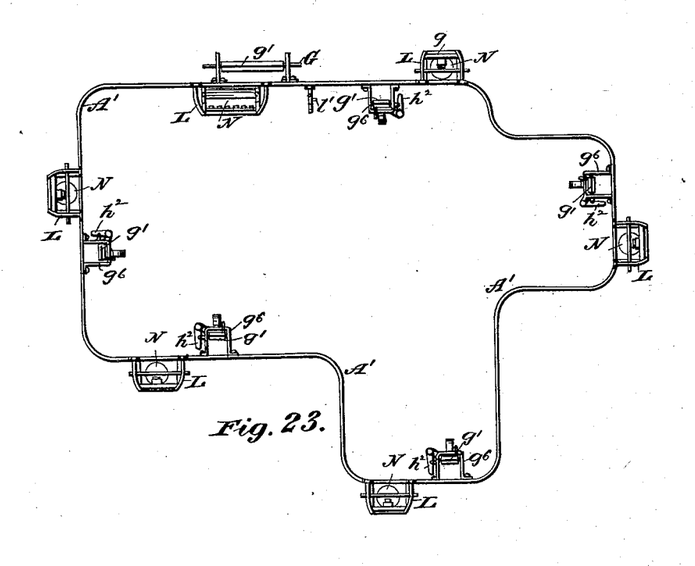
Fig. 23 represents a top plan view of an apparatus, showing one of a variety of forms which the system may assume when adjusted for use in a building.

The carriage consists of a suitable supporting-frame D, provided with a pair of supporting-wheels $d$, arranged one in front of the other and having their peripheries grooved in order to seat securely upon the rounded upper edge of the rail A. To prevent the motor from tilting sidewise, a standard $d'$ is fixed to the supporting-frame and is provided at its upper end with a pair of upwardly-extending studs $d^2$, upon which guide-rollers $d^3$ are loosely mounted in position to engage the opposite faces $a'$ of the upper rail A'. The electromotor (represented conventionally in Fig. 1 by $d^4$ and supposed to be located within the shell of the simulated engine-boiler $d^5$ in Fig. 19) is supported upon the frame D and electrically connected with the upper and lower rails by suitable brushes $d^6$. (See Fig. 19.) The motor is connected with one of the supporting-wheels $d$ of the carriage by gear of any well-known and suitable form, by which the action of the motor will tend to rotate the wheel, and thereby cause the carriage to travel along the track. From the supporting-frame D of the carriage arms E extend upwardly and outwardly from the opposite sides of the carriage, said arms carrying upon their outer ends upon each side of the carriage a pair of parallel bars $e\ e'$, the former being preferably of larger diameter than the latter and both being fixed in positions parallel with each other and with the line of track and provided with rounded or pointed ends $e^2$ at the front. The bar $e'$ is preferably located immediately below the bar $e$, and their length is intended to be sufficient to support thereon one pouch for each of the several stations along the line of track. In representing the pouch-support upon the carriage in the form of two bars arranged parallel to each other a form has been adopted which has been found to be simple, effective, and a saving of metal. It is not, however, necessary that said support should be in the form of two separate bars, the object aimed at being to provide bearings vertically elongated or separated, so as to prevent the pouch received thereon from having any lateral swaying movement. The bars $e\ e'$ upon one side of the carriage are for the purpose of collecting the pouches at the several stations and discharging them at the cashier's station, while the corresponding bars upon the opposite side of the carriage are for the purpose of collecting the pouches at the cashier's station and discharging them at the proper stations along the line. For the purpose of preventing the pouches from sliding off the rear end of the bar $e$ a vertically-sliding stop $e^3$ is provided, the same being located in a seat near the rear end of the bar and loosely attached at its lower end to one arm $e^4$ of a vibrating lever fulcrumed, as at $e^5$, upon a suitable bearing below the bar, the opposite arm of the said lever being extended, as shown at $e^6$, Fig. 21, transversely to the line of travel for the purpose of engaging suitable actuating-cams located at the several stations, as will hereinafter more particularly appear. It is intended that the stop $e^3$ shall have sufficient friction in its bearing and that the lever which operates the stop shall be so balanced upon its fulcrum that when the stop is up it will remain in that position until positively acted upon to depress it, and when depressed it will so remain until positively acted upon to elevate it. In order to provide against the stop working loose, so that it may unintentionally rise or fall, a cushion $e^7$ is located in proximity thereto within the end of the bar $e$, and an adjusting-screw $e^8$ is seated in the end of the bar in engagement with the cushion for adjusting it toward and away from the stop and so conveniently regulating the amount of friction required.

Figure 19:
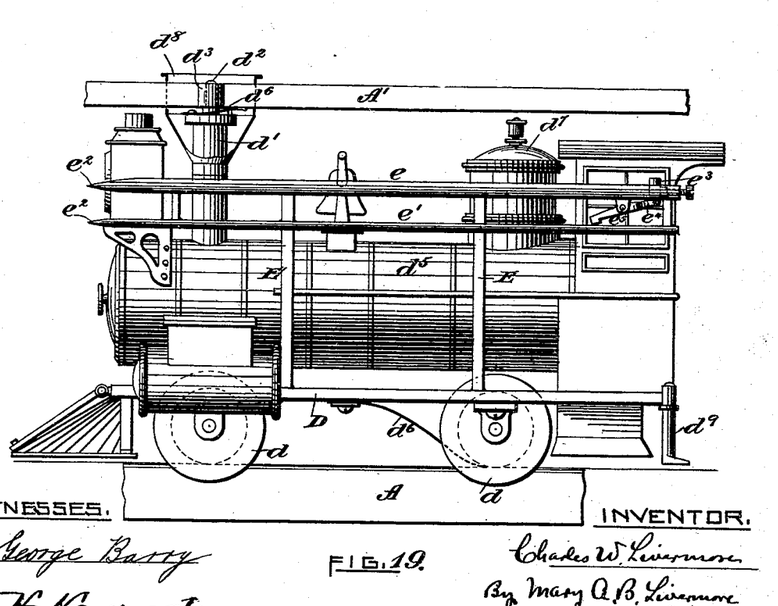
Figs. 19 and 20 represent, respectively, a side elevation and top plan view of the carriage so constructed as to have the general appearance of a locomotive-engine.
Figure 20:
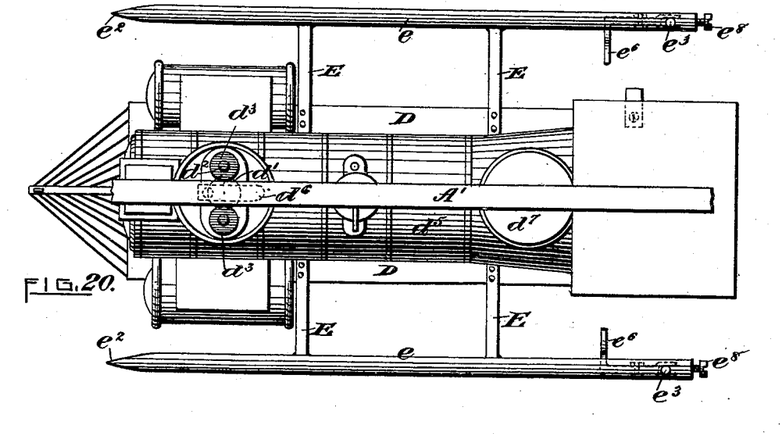

In order to give the motor an attractive appearance, it is incased in a simulated boiler $d^5$ like that of a railroad-locomotive and provided with a simulated steam-chest $d^7$ and smoke-stack $d^8$, the latter being recessed at its upper end to embrace the opposite sides of the upper rail A' and shield the guide-rollers $d^3$ from view. The said carriage is also provided with simulated steam-cylinders, head-light, cow-catcher, cap, and bell to further give it the general appearance of a locomotive.

Figure 17:
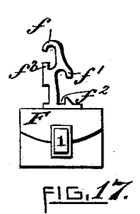
Figs. 17 and 18 represent two of the series of pouches which may be employed for transferring the cash.
Figure 18:
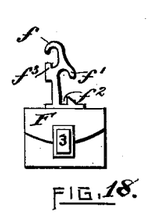

Two pouches are represented upon a small scale in Figs. 17 and 18. In general construction the pouches are all similar to one another, but each is provided with its own particular discharge-tongue. The bodies F of the pouches are conveniently of rectangular form, as shown, and each is provided with a number fixed thereto to correspond with the number of the station to which it belongs. Each pouch has a peculiar-shaped hook fixed to its upper edge for the threefold purpose of supporting the pouch in position to be collected by the carriage for discharging the pouch and for its support upon the carriage. The upper hook-section $f$ is for the purpose of supporting the pouch at the stations in position to be collected, and the lower hook-section $f'$, in connection with a shallow depression $f^2$, is for the purpose of receiving the upper and lower bars $e\ e'$ of the carriage, by which the pouch will be supported in such position upon the carriage as to present the tongue $f^3$ between jaws fixed at the station for the purpose of discharging it. It will be observed that the tongue $f^3$ of the pouch numbered 1 is longer vertically than the tongue $f^3$ of the pouch numbered 3. From such construction it follows that a pair of discharging-jaws may be set at such a distance apart as to allow the tongue $f^3$ to pass through between them without engaging it, while the longer tongue $f^3$ would be engaged and the pouch numbered 1 caused to stop. The punch, or rather the peculiar hook-support to which the body of the pouch is attached, is thus particularly adapted to use in connection with a carriage of the form hereinbefore particularly described, and also in connection with devices for discharging it and supporting it in position to be collected, which will now be particularly described.

At each station there is located a support for retaining the pouches in position to be picked up by the continuously-moving carriage. Such support consists in the present instance of a bar G, supported horizontally at the side of the track by means of a suitable standard $g$ and covered by a hood $g'$, fixed above it and spaced therefrom such a distance as to prevent the pouch from being placed thereon in any other position than with the upper hook portion $f'$ engaged upon the upper side of the bar, with the point of the hook away from the track. This provision effectually prevents any liability of suspending the pouch reversed or hooked higher or lower than the proper position, and so does away with mistakes and with time spent in examining the pouch to see whether or no it is supported correctly. When the track is at such a height as to bring the support G within convenient reach of the clerk, the standard $g$ may be fixed to the lower rail; but when the track is too high for convenient reach, as would be usually the case, the standard G is fixed to a vertically-sliding bracket $g^2$. The bracket $g^2$ is mounted upon a pair of depending guide-rods $g^3$, attached at their upper ends to the lower rail and provided at their lower ends with a cross-head $g^4$, fixed thereto. The bracket $g^2$ is preferably of skeleton form, as shown, and provided with bearings $g^5$ at its four corners, the bearings upon the same side being separated sufficiently to prevent any tendency of the carriage to bind upon the rods $g^3$ in sliding thereon. The upper ends of the guide-rods $g^3$ are attached to the lower rail by means of a U-shaped bracket $g^6$, the ends of the branches of which are fixed to the side of the rail, the bracket projecting out laterally therefrom and having the rods $g^3$ secured in vertical bearings $g^7$ near its outer end, so that when out of use the said guide-rods may be slid upwardly through the bracket and held in vertical adjustment by means of a set-screw—for example, $g^8$—inserted through the wall of the bearing $g^7$ into contact with the rod. The vertically-sliding bracket $g^2$, with the pouch-support thereon, is conveniently elevated by means of a cord $g^9$, attached thereto and extending up over a guide-pulley H, mounted at the outer end of the bracket $g^6$, and thence downwardly within reach of the clerk, terminating in a handle $h$. The weight of the sliding bracket $g^2$ and the pouch-support is such that when released they will fall to their lowermost adjustment under the influence of gravity. To secure the sliding bracket $g^2$ temporarily in elevated adjustment while the pouches are awaiting the approach of the carriage, a latch $h'$ is attached at one side of the bracket, and a spring-actuated trip-arm $h^2$ is pivoted to a suitable projection on the bracket $g^6$ in position to engage the latch when the slide bracket is elevated and retain it until the said spring-actuated trip-arm is released by a movement opposed to the tension of its actuating-spring $h^3$. The free end of the trip-arm projects toward the track across the path of a depending arm $d^9$ at the rear of the carriage, so that when the carriage shall have passed the pouch-support and shall have taken therefrom any pouch which may have been suspended thereon it will engage the trip-arm $h^2$, releasing it from the latch and allowing the bracket, together with the pouch-support, to drop to its lowermost adjustment into position to again receive a pouch to be sent to the cashier's station. In order to more firmly secure the bracket $g^6$ in its position relative to the upper as well as the lower rail, a brace $h^4$, of curved or other advantageous form, may be extended from the outer portion of the bracket $g^6$ upwardly and over to the upper rail $A'$.

Figure 8:
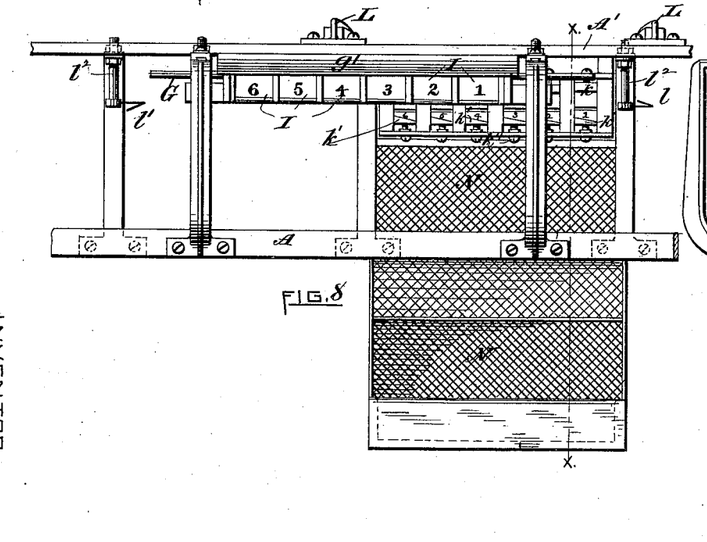
Fig. 8 is a side or front elevation of the cashier's station.
Figure 9:
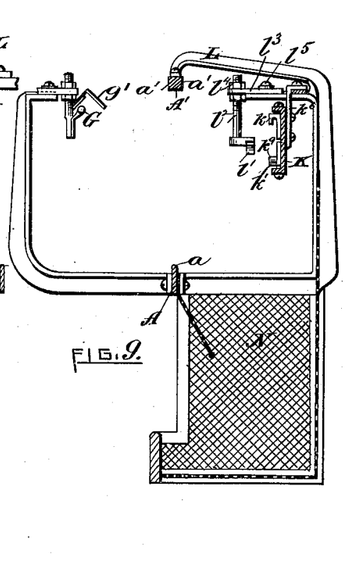
Fig. 9 is a view of the same in end elevation.
Figure 10:
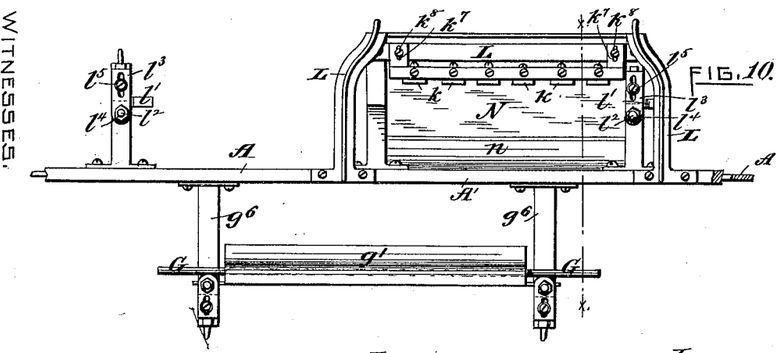
Fig. 10 is a top plan view of the same.
Figure 11:
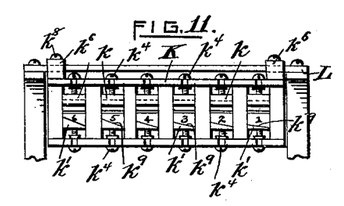
Fig. 11 is a front view in detail of a series of pairs of receiving-jaws at the cashier's station.

The mechanism for supporting the pouch in position to be collected by the carriage, as thus described, is the same or substantially the same at each of the stations, and so far as the supporting-bar and its hood are concerned is the same as that which is located at the cashier's station. At this station, however, as shown particularly in Figs. 8, 9, and 10, the bar G is fixed in its position and considerably longer than the corresponding bars at the clerk's station along the line, for the reason that it is intended to retain a number of pouches thereon equal to the number of stations. To enable the cashier to place the pouches in such position on the supporting-bar at his desk as to cause them to be delivered at their proper stations along the line, the different parts of said bar are indicated in sections, the said sections being numbered 1 2 3, &c., to correspond with the number of the pouches and with the stations, so that if the cashier should desire to send out from his station pouches 1 and 3 he would hang number 3 upon the supporting-bar G opposite the section numbered 3 and the pouch 1 opposite the section numbered 1. This order of hanging the pouches on the bar is material, inasmuch as it is essential that those having the shorter tongues $f^3$, as hereinbefore referred to, should be placed in position in advance of those having the longer tongues, so as to pass freely through the stopping-jaws at such stations as are intermediate between the cashier's station and their destination. With the said numbered sections (indicated by the letter I in Fig. 8) before him he can readily place the pouches in their proper order without hesitancy. It will be also noticed that the supporting-bar for collection is on the opposite side of the track at the cashier's station from that on which the corresponding bars are located at the stations, since the pouches collected from the cashier's station are to be distributed at the stations along the line, while those collected along the line are to be discharged at the cashier's station.

Figures 12, 14, 15:
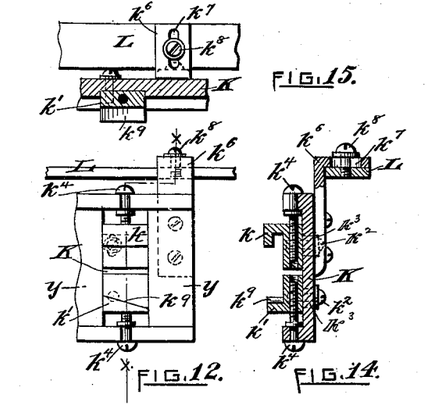
Fig. 12 is an enlarged view in detail of one pair of said jaws, showing the means for adjusting them.
Fig. 14 is a transverse vertical section through line $x$ $x$ of Fig. 12.
Fig. 15 is a top plan view of the parts represented in Fig. 12, a portion of the same being shown in horizontal section along the line $y$ $y$ of Fig. 12.
Figure 13:
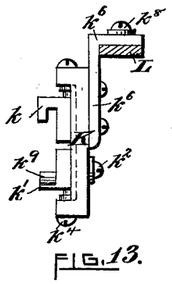
Fig. 13 is a view of the same in end elevation.
Figure 16:
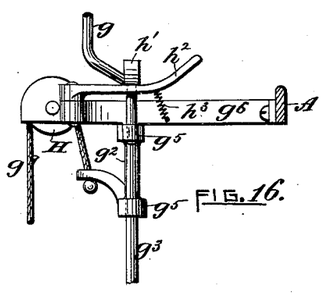
Fig. 16 is an enlarged view in detail of a portion of the apparatus for elevating the pouches into position to be collected, showing the mechanism for tripping the pouch-elevating device.

At each station and upon the side of the track opposite that from which the pouches are collected a mechanism for removing the pouches from the carrier is located. Such mechanism consists, essentially, of a pair of jaws $k\, k'$, (shown upon a larger scale in Figs. 12, 13, and 14,) provided with an opening between them of the same general conformation as the tongues $f^3$ on the pouches and secured to a back plate K by means of screws $k^2$, which extend through elongated slots $k^3$ in the plate into the backs of the jaws, so as to admit of the jaws being slid toward and away from each other to vary the opening between them. For the purpose of adjusting the jaws toward and away from each other screws $k^4$ extend loosely through the top and bottom branches of the plate K and engage threaded perforations in the jaws. By slightly loosening the screws $k^2$ and then turning the screws $k^4$ the jaws may be varied toward and away from each other, and when the adjustment is perfected they may be held firmly in position by again tightening the screws $k^2$. The back plate K is itself firmly fixed to an angle-plate $k^6$, the latter being provided with an elongated slot $k^7$ in its horizontal flange, through which a binding-screw $k^8$ extends into a bracket L, by means of which the jaws may be moved bodily toward and away from the plane of the upper and lower rails. The bracket L is firmly fixed at its lower and upper ends to the lower and upper rails, respectively, and is formed of such rigid material as to prevent any considerable swaying to vary the position of the jaws with relation to the rails. In the form herein shown the lower jaw is preferably provided with an inclined bearing-face $k^9$, by means of which the pouch which has been grasped by the jaws and removed from the carriage will be free to disengage itself from the jaws and drop, and also to prevent any liability of the wrong pouch being disengaged because of any slight variation in the relative positions of the jaws and carriage. When a pouch is grasped by the jaws at a station, it is of course necessary that the stop at the rear end of the supporting-bar on the carriage should be withdrawn to allow the pouch to slide off. This movement of the stop is effected by means of a cam $l$, with which the lever-arm $e^6$ on the carriage engages before the pouch reaches the rear end of the bar, lifting the said arm, and thereby depressing the stop. A similar cam $l'$ is located at the opposite end of the station, but in reverse order, for the purpose of depressing the arm $e^6$, and thereby again elevating the stop until the next station is reached. The cams $l\ l'$ are conveniently formed by pieces of spring metal having their free ends bent backwardly in an inclined position, forming a sharp angle at the point and their inclined free ends extending the one upwardly and the other downwardly to produce the desired effect. The said cams are supported by means of hangers $l^2$, secured to plates $l^3$ at the top of the bracket L in vertical adjustment conveniently by having their ends threaded and provided with adjusting-nuts $l^4$ above and below the plate. The plates $l^3$ are secured to a fixed portion of the bracket by means of binding-screws $l^5$, which extend through elongated slots in the plates into the bracket, and thus serve to adjust the hangers, with their cams, toward and away from the plane of the upper and lower rails.

From the bracket L hollow hangers M depend and form side supports for a pouch-receiving pocket N, formed, preferably, of some suitable flexible fabric and located with its mouth beneath the grasping-jaws $k\ k'$, so that a pouch falling from the jaws will be received therein. The upper end of the pouch is preferably provided with a funnel-shaped mouth $n$ to guide the pouches into the pocket. As herein shown, the bottom $n'$ of the pocket is provided with an upwardly-projecting annular flange $n^2$, adapted to shut within the bottom rim $n^3$ of the body portion, the bottom itself being free to move away from and toward the body portion at pleasure. For convenience in manipulating it the said bottom is provided with a handle $n^4$. The bottom is held normally in its closed position by means of springs $n^5$, in the present instance, shown secured at their upper ends within the hollow hangers M and at their lower ends to arms $n^6$, attached to the bottom $n'$. To afford a guide for the movement of the bottom away from and toward the pocket, hollow rods $n^7$ are provided, secured at their lower ends to the handle $n^4$ and free to slide within the hollow hangers M. The hollow rods $n^7$ surround the springs $n^5$. Thus when a pouch has been discharged into the pocket N it may be removed therefrom by drawing the bottom $n'$ downwardly from the body of the pocket, and when removed the bottom will rise to its normal position under the tension of the spring $n^5$.

At the cashier's station there are provided several pairs of grasping-jaws $k\ k'$, arranged in close proximity to each other, the several pairs having their jaws separated from each other at different distances, so that different pouches, when there are several on the collector side of the carriage, will be grasped by different pairs of jaws and discharged from the collector by several separate pressures in order to prevent any liability of the pouches becoming jammed upon their supports or otherwise caused to bind and prevent their free discharge.

The operation of the apparatus as a whole having been already outlined, and the operation of each specific feature having been described in connection with the parts which coact therewith, a further recital of the operation will be omitted.

What is claimed is—

1. In a cash-carrier apparatus, the combination, with a track and a pouch supported near the track, of a carriage adapted to move along the track, the said carriage being provided with a pair of parallel bars located upon the side thereof and extending in the direction of the movement of the carriage in position to engage the supported pouch, substantially as set forth.

2. In a cash-carrier apparatus, the combination, with a track, a pouch-support near the track, and a pouch, of a stop upon the opposite side of the track to release a pouch and a carriage adapted to move along the track, the said carriage being provided upon each of its opposite sides with a pouch collector and distributer, the said collector and distributer extending longitudinally in the direction of the path of movement of the carriage and having vertically-separated bearings for engaging the pouches and preventing them from swaying laterally, substantially as set forth.

3. In a cash-carrier apparatus, the combination, with a carriage having a collector and distributer bar secured thereto, of a stop seated in the bar and having a reciprocatory sliding movement transversely thereto and a lever for operating the stop, substantially as set forth.

4. In a cash-carrier apparatus, the combination, with a carriage having a collector and distributer bar secured thereto, of a stop seated in the bar and having a reciprocatory movement transversely thereto and a lever fulcrumed to the bar and loosely connected with the stop to operate it, substantially as set forth.

5. The combination, with the collector and distributer bar, of a stop seated therein and having a reciprocatory sliding movement transversely to the bar and means for applying friction to the stop to hold it in the desired adjustments, substantially as set forth.

6. The combination, with the collector and distributer bar, of a stop seated therein and having a reciprocatory movement transversely to the bar, the stop being held in its adjustment by friction, and a device for regulating the friction of the stop, substantially as specified.

7. The combination, with the pouch-support at the side of the track, the collector and distributer on the carriage, and the grasping device at the opposite side of the track, of the pouch separable from the support, carriage, and grasping device and provided with separate retaining devices corresponding, respectively, to the said support, collector and distributer, and grasping device, substantially as set forth.

8. The combination, with the pouch-support at the side of the track, the collector and distributer on the carriage, and the grasping device at the opposite side of the track, of the pouch provided with an attachment, from which the receptacle portion of the pouch is suspended, the said attachment comprising a device to engage the support at the side of the track, a device to engage the collector and distributer, and a device to engage the said grasping device, substantially as specified.

9. The combination, with the pouch provided with its attachment for supporting it, of a pouch-supporting bar and a guide located over the bar and spaced therefrom for preventing the improper suspension of the pouch, substantially as specified.

10. The combination, with the bracket adapted to rise and fall and the pouch-support carried thereby, of a catch fixed to the said bracket, and a spring-actuated arm supported in position to engage the catch when the pouch is elevated, the free end of the spring-actuated arm extending across the path traversed by the carriage, whereby the latter releases the pouch-support and allows it to fall as the carriage passes, substantially as set forth.

11. The combination, with the pouch and its releasing-tongue fixed rigidly thereto above the pouch and means for conveying the pouch along the track, of grasping-jaws fixed at the side of the track in position to receive the tongue on the pouch, substantially as set forth.

12. The combination, with the pouch and its laterally-projecting releasing-tongue and means for conveying the pouch along the track, of grasping-jaws fixed at the side of the track in position to receive the tongue on the pouch, one of the jaws having an inclined face, and means for adjusting the jaws toward and away from each other and toward and away from the plane of the rails, substantially as set forth.

13. The combination, with the track and the pouch-grasping device located at the side of the track, of a pocket beneath the grasping device for the reception of the pouch, the pocket having a spring-actuated bottom free to move away from and toward the body of the pocket, and guide-rods for directing the movement of the bottom, substantially as set forth.

14. The combination, with the grasping-jaws and the track, of a support for the grasping-jaws fixed rigidly to the upper and lower rails of the track and a receiving-pocket suspended from the said support, substantially as set forth.

15. The combination, with the track, the carriage provided with a distributer, and a reciprocating stop on the distributer, of a grasping device at the side of the track and inclines located at points along the track in the path of the stop, one of the inclines tending to throw the stop out of the path of the pouch and the other to throw the stop into the path of the pouch, substantially as set forth.

MARY A. B. LIVERMORE,
*Executrix of Charles W. Livermore, deceased.*

Witnesses:
OSCAR LAPHAM,
EDMUND DAY.